US010660165B2

(12) United States Patent
Franchi et al.

(10) Patent No.: US 10,660,165 B2
(45) Date of Patent: May 19, 2020

(54) COOKING SYSTEM PARTICULARLY FOR PASTA, RICE AND BREAD

(71) Applicant: WHIRLPOOL CORPORATION, Benton Harbor, MI (US)

(72) Inventors: Daniele Franchi, Comerio (IT); Charles Lai, Shenzhen (CN)

(73) Assignee: Whirlpool Corporation, Benton Harbor, MI (US)

( * ) Notice: Subject to any disclaimer, the term of this patent is extended or adjusted under 35 U.S.C. 154(b) by 239 days.

(21) Appl. No.: 15/135,795

(22) Filed: Apr. 22, 2016

(65) Prior Publication Data

US 2016/0316524 A1 Oct. 27, 2016

(30) Foreign Application Priority Data

Apr. 23, 2015 (EP) .................................. 15164884

(51) Int. Cl.
*H05B 6/64* (2006.01)
*A47J 37/06* (2006.01)
*A47J 27/00* (2006.01)
*H05B 6/78* (2006.01)

(52) U.S. Cl.
CPC .......... *H05B 6/6473* (2013.01); *A47J 27/004* (2013.01); *A47J 37/0629* (2013.01); *A47J 37/0664* (2013.01); *H05B 6/6447* (2013.01); *H05B 6/782* (2013.01); *A47J 2027/006* (2013.01)

(58) Field of Classification Search
CPC .... H05B 6/6447; H05B 6/647; H05B 6/6473; H05B 6/6482; H05B 6/6485; A47J 27/004; A47J 36/0664; A47J 37/0629; A47J 37/0664; A47J 36/165; F24C 7/02
USPC ................................ 219/680, 681, 725, 726
See application file for complete search history.

(56) References Cited

U.S. PATENT DOCUMENTS

| 4,870,896 A * | 10/1989 | Asahina | A21B 7/005 29/428 |
| 4,906,485 A * | 3/1990 | Kirchhoff | A21B 3/04 126/20 |
| 4,959,517 A * | 9/1990 | Jump | A47J 36/027 219/726 |
| 5,271,673 A * | 12/1993 | Bohnet | A47J 36/027 219/734 |
| 5,360,965 A * | 11/1994 | Ishii | H05B 6/64 219/685 |
| 5,493,955 A * | 2/1996 | Belongia | A21B 7/005 126/194 |

(Continued)

FOREIGN PATENT DOCUMENTS

CN 200987621 Y 12/2007
GB 2248375 A 4/1992

(Continued)

*Primary Examiner* — Tu B Hoang
*Assistant Examiner* — Erin E McGrath
(74) *Attorney, Agent, or Firm* — Price Heneveld LLP

(57) ABSTRACT

A cooking system for preparation of foods, comprises an oven with a microwave source and a convection heater, and a bowl with a stirrer; the system further comprises at least a couple of interchangeable bowls, a plastic bowl being configured to be used when microwave source is in an activated configuration and a metal bowl being configured to be used when heater is in an activated configuration.

18 Claims, 3 Drawing Sheets

(56) References Cited

U.S. PATENT DOCUMENTS 6,026,735 A * 2/2000 Waterworth .......... A47J 27/002
366/146
2013/0334214 A1* 12/2013 Yogev .................. H05B 6/6441
219/702

FOREIGN PATENT DOCUMENTS

GB            2488335 A    8/2012
WO      2006030265 A2    3/2006

* cited by examiner

COOKING SYSTEM PARTICULARLY FOR PASTA, RICE AND BREAD

FIELD

The present disclosure relates to a cooking system for the preparation of different foods, comprising an oven with a microwave source and a heater, a bowl with a stirrer configured to stir ingredients inside the bowl during cooking.

BACKGROUND

Microwave ovens with powered stirrer assemblies are known in the art, for instance from GB2248375, GB2488335 and WO2006/030265. Such known stirring assemblies include paddles or the like which mix food being cooked and reduce the formation of hot spots.

From CN200987621 it is also known a microwave oven for making bread.

All the above known solutions comprise a single type of bowl which is mainly dedicated to a single cluster of food products. This reduce the flexibility of use of the microwave oven since a bowl specifically designed for cooking rice or pasta is not the best choice for cooking bread or similar products.

It is therefore an object of the present invention to provide a cooking system as described in this description which solves the problems listed above regarding deficiencies in other devices flexibility in use.

These and other features, advantages, and objects of the present cooking system will be further understood and appreciate by those skilled in the art upon studying the following specification, claims, and appended drawings. According to the invention, such problem is solved thanks to the features listed in the appended claims.

SUMMARY

According to the cooking system described herein, the cooking system is provided with more than one interchangeable bowls of different materials, and specifically a plastic bowl configured to be used in the oven when a microwave source is switched on for the cooking of pasta, rice or the like and a metal bowl configured to be used when only the heater is switched on for cooking of bread or the like. With the term "heater" we mean here any heat radiating member including tubular electric resistance, halogen heating member, or electrical resistances contained in a dedicated sub-chamber of the oven where a forced air flow is generated. With the above solution of different bowls dedicated for different clusters of food it is possible to optimize the use of microwaves and/or of the heater.

According to another embodiment of this system, the cooking system comprises a water reservoir in the oven and dosing means configured to feed a predetermined amount of water in the bowls depending on the kind of food to be cooked.

According to another embodiment of this system, the oven comprises sensing means capable of sensing the specific bowl used in the oven and steering the microwave source or the heater.

According to another embodiment of this system, the cooking system also comprises specific packages of ingredients with dedicated tags or RFID devices which are detected by a sensor of the oven in order to automatically select a specific cooking program without any intervention by the user.

According to another embodiment of this system, the plastic bowl is associated with a stirrer including paddles moving at a short distance from the interior sides of the bowl to reduce any tendency of the formation of hot spots in the food being cooked. In the tests performed by the applicant, this has been seen particularly beneficial in the cooking of pasta or rice.

According to another embodiment of this system, the metal bowl is associated with a stirrer having a single paddle which is hinged to a supporting bar so that in a first direction of rotation the paddle interacts with the food and stirs it, while in a second direction of rotation the paddle is substantially flat and parallel to the bottom wall of the bowl. This has been found to be very beneficial in terms of a proper and efficient cooking of bread or the like. Moreover, the shape of the paddle has preferably a curved upper profile (at least in the upright configuration thereof) where two distinct curved "peaks" are present, one higher and closer to the center of the bowl and the other lower and closer to the side wall of the bowl. This latter curved portion is angularly slightly rotated with respect to the flat surface of the paddle, and this angle is preferably comprised between 2° to 30°. The above shape of the paddle for the metal bowl has proven very beneficial in accelerating the cooking of the bread in the cooking system according to the disclosure.

Further features and advantages of a cooking system according to the disclosure will become clear from the following detailed description, provided as a non-limiting example with reference to the attached drawings.

These and other features, advantages, and objects of the present device will be further understood and appreciated by those skilled in the art upon studying the following specification, claims, and appended drawings.

DETAILED DESCRIPTION OF EMBODIMENTS

Figure 1:
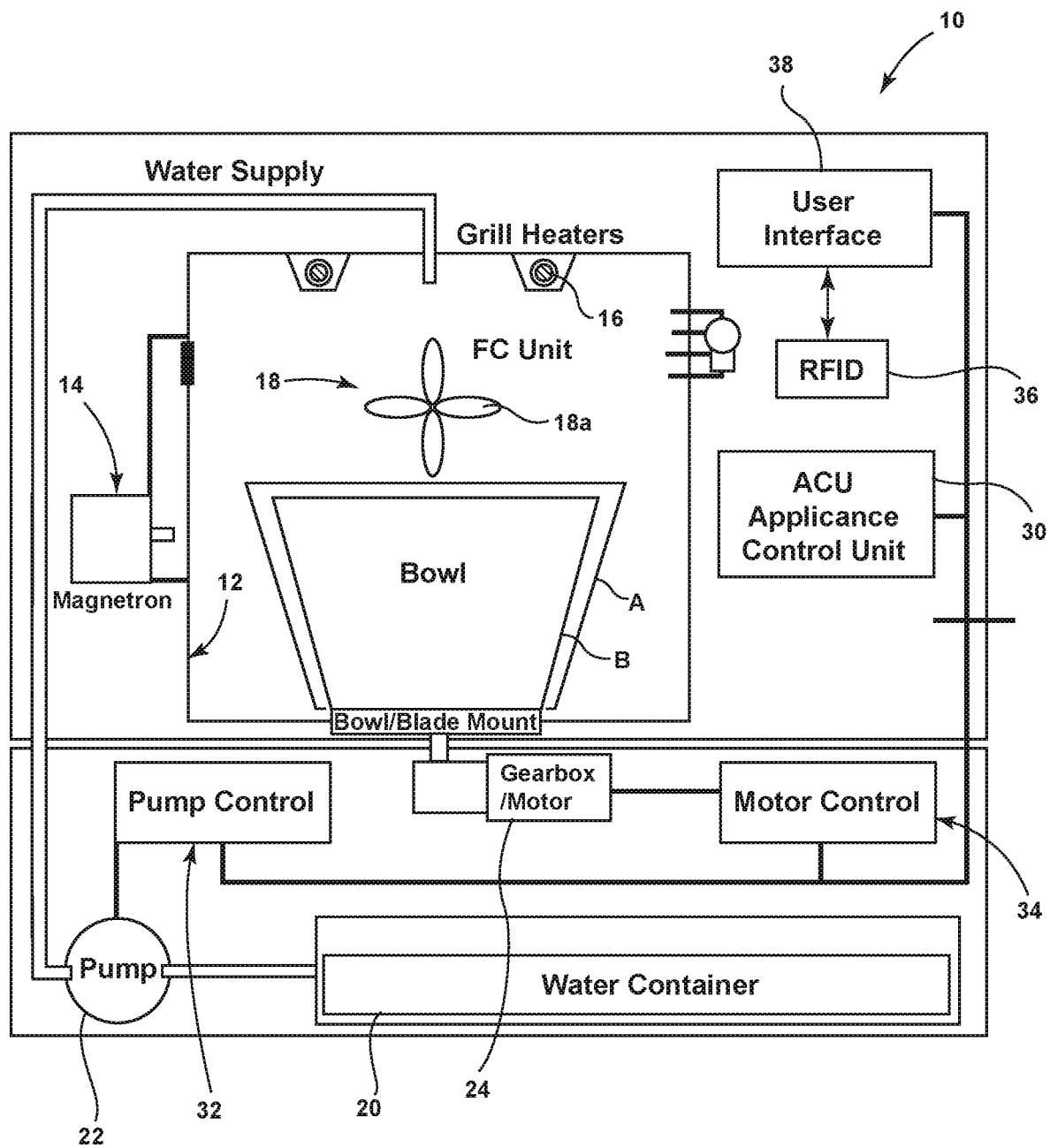
FIG. 1 is a schematic view of a cooking system according to the disclosure.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to the drawings, a cooking system according to the disclosure comprises an oven 10 having a cavity 12 where two interchangeable bowls A and B can be mounted. The oven 10 comprises a microwave source 14 (for instance a magnetron or a solid state microwave generator), grill heaters 16 on the top of the cavity 12 and a forced convection unit 18, for instance provided with a resistance (not shown) placed in a rear hollow space where also a fan 18a is placed for directing hot air towards the cavity. The oven 10 further comprises a water container 20, for instance a removable drawer placed in the bottom area of the oven, connected to a dosing pump 22 for supplying a metered amount of water to the bowls A or B. In the oven 10 there is also a motor and gearbox 24 which provides, in a known way, motion to a stirrer 26 or 28 (FIGS. 2, 3) inside the bowls A or B. The oven 10 further comprises a control unit 30 including a pump control 32 and a motor control 34, such control unit 30 being also connected to a RFID sensor 36 configured to recognize a package (not shown) with a transponder when it is placed near the RFID sensor, and to a user interface 38.

The water container 20 is provided with a level sensor (not shown), for instance of the type having several metal parts connected to an electronic circuit detecting the water level on the basis of conductivity or capacitance measures, in order to inform the control unit 30 when the water level is not sufficient for performing a predetermined cooking program, for instance a cooking program using the highest amount of water.

Figure 2:
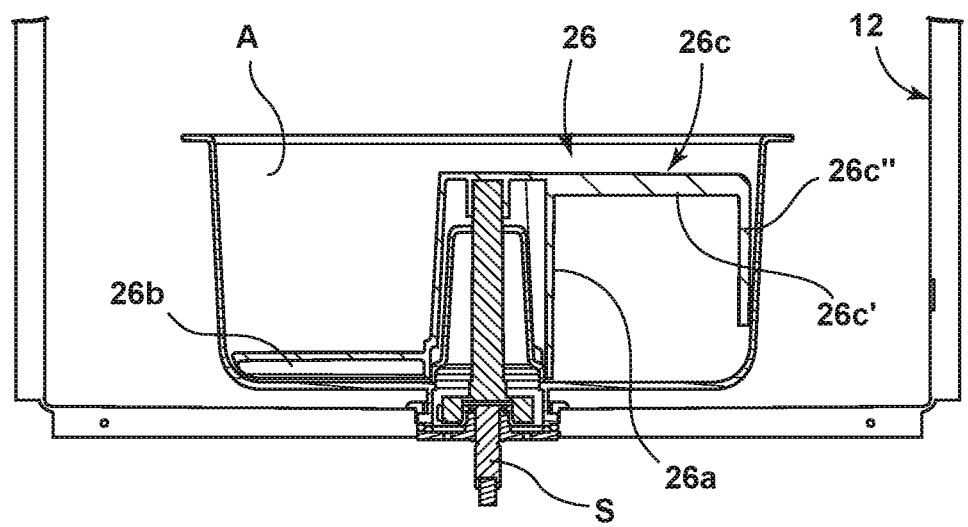
FIG. 2 is a detailed sectioned view of a first bowl and related stirring system used in the cooking system of FIG. 1.
Figure 3:
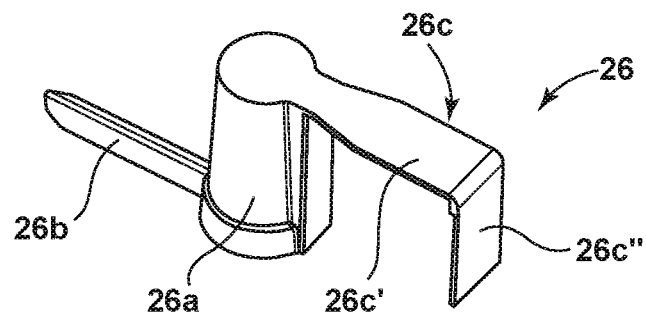
FIG. 3 is a perspective view of a detail of FIG. 2.

With reference to FIG. 2, a plastic bowl A is shown where a first stirrer 26 is used. Such stirrer 26 presents a central cylindrical portion 26a, a lower paddle 26b stemming out from a bottom part of the portion 26a and a upper paddle 26c at 180° with respect to the lower paddle 26b, with a connecting portion 26c' and a stirring portion 26c'' which in the installed configuration shown in FIG. 2 is vertically placed at a short distance from the side wall of the bowl A. Also the lower paddle 26b is, in its installed configuration, is at a short distance from the bottom wall of the bowl A.

Figure 4:
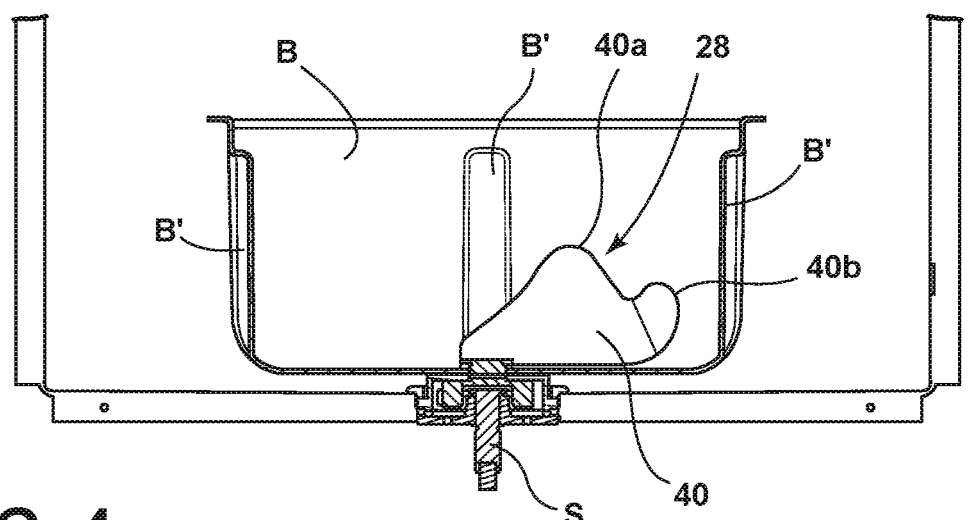
FIG. 4 is a detailed section view of a second bowl and related stirring system used in the cooking system of FIG. 1.
Figure 5:
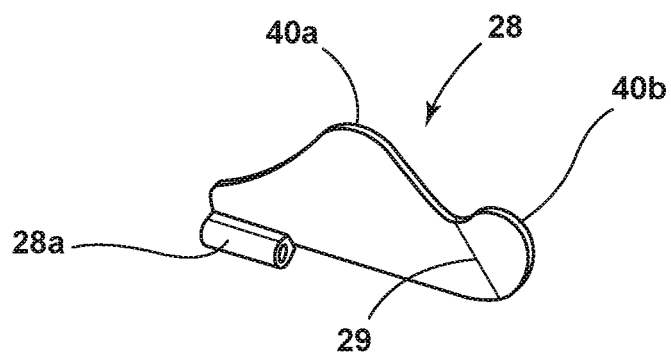
FIG. 5 is a perspective view of a detail of FIG. 4.

With reference to FIG. 4, a metal bowl B is shown which presents protruding ribs B' and in which the second stirrer 28 is mounted. Such stirrer presents a hinge portion 28a which allows an upright configuration thereof (shown in FIG. 4) when the stirrer shaft S rotates in a clockwise direction, and a flat configuration (not shown) when the stirrer shaft S rotates in a counterclockwise direction. The stirrer 28 presents a paddle 40 having a substantially flat configuration and having an upper humps-shaped profile with a first curved portion 40a and a second curved portion 40b which is angled with respect to the first portion 40a (the separation line between such portions is shown in FIG. 5 with line 29). The second curved portion 40b, in the upright configuration of the paddle 40, is at a height lower than the first curved portion 40a and its angle referred to the remaining portion of the paddle is preferably comprised between 2° and 30°. Such angle is mainly due to the passage from an idle configuration of the second stirrer 28 to the upright configuration thereof, when the direction of rotation of the shaft S is changed.

Figure 6:
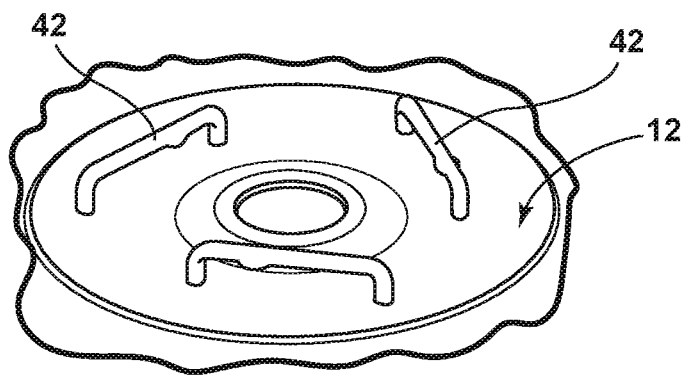
FIG. 6 is a perspective view of a detail of the oven, and particularly of its portion for fixing the bowls.

With reference to FIG. 6, the bowl A or B are fixed to the bottom wall of the cavity 12 by means of L-shaped legs (not shown) snap engaging with C-shaped metal bars 42 protruding from the bottom wall of the cavity 12.

Figure 7:
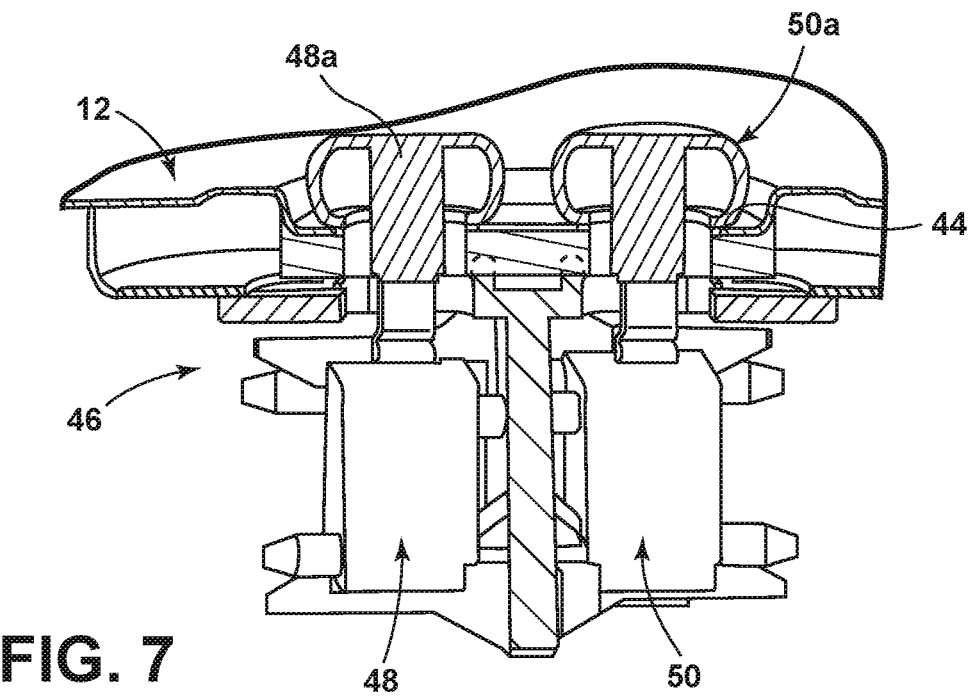
FIG. 7 is an enlarged section view of a sensor used in the oven of the cooking system of FIG. 1.

With reference to FIG. 7, the bottom wall of the cavity 12 is further provided with an opening 44 through which a sensor assembly 46 is protruding, such sensor assembly comprising a first detector 48 with an actuating end 48a and a second detector 50 with an actuating end 50a. The detectors 48 and 50 are placed at different radial distances from the shaft S of the stirrers 26 and 28, so that when plastic bowl A, which is bigger than metal bowl B, in mounted on the metal bars 42, both detectors 48 and 50 are activated so that the control unit 30 is informed about what kind of bowl is installed. When the metal bowl A is installed, only the detector 48, which is closer to the shaft S, is activated and the control unit is informed accordingly.

When the user wants to use the ingredients contained in a certain package (not shown), he/she has only to put the package at a short distance from the RFID reader 36 which automatically detects the package and programs the control unit 30 accordingly. Then the user open the package and, by following the instructions appearing on the user interface 38, loads the content of the package into the bowl A or the bowl B, together with its stirrer 26 or 28 respectively. Then the user inserts the bowl A or B into the cavity 12 and, by following the instruction on the user interface 38, press the on button so that the cooking program is initiated. During the cooking program, the control unit 30 feeds information to the water dosing system 22, to the motor 24 and to the microwave source 14 and/or to the convection heating means 16 and 18 in order to automatically cook the food. At the end of the cooking the user interface 38 informs the user that he/she can take the cooked food out of the cavity 12.

Of course the oven 10 of the cooking system according to the disclosure can also be used as a traditional combined oven, i.e. an oven where food can be cooked with microwaves only, with heating resistances only or by a combination of both.

From the above description the advantages of a cooking system according to the disclosure are clear, and particularly the flexibility of use which allows passing from an automatic cooking of rice or pasta to the cooking procedure to prepare bread at home, simply by changing the bowl and the related stirrer. Moreover the automatic recognition of the ingredients to be put in the bowl make the cooking of the above food very easy also for people with a limited cooking experience. Even if the above description is focused on the cooking of bread with radiating and convection heaters only, the cooking system according to the invention may be used also for preparing the dough for pizza, which can be consequently cooked in the oven itself.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above are merely for illustrative purposes and not intended to limit the scope of the device, which is defined by the following claims as interpreted according to the principles of patent law, including the Doctrine of Equivalents.

What is claimed is:

1. A cooking system for the preparation of foods, comprising:
    an oven having a microwave source and a heater;
    a plastic bowl including a first stirrer, wherein the plastic bowl is configured to be mounted to the oven, and wherein the plastic bowl is configured to be used when the microwave source is activated; and
    a metal bowl interchangeable with the plastic bowl, wherein the metal bowl is configured to be mounted to the oven, and wherein the metal bowl is configured to be used when the heater is activated; and
    a plurality of metal bars, each of the plurality of metal bars including a central body spaced apart from a bottom wall of the oven to define a receiving space, a first end coupled with the bottom wall of the oven, and a second end coupled with the bottom wall of the oven, wherein each of the plastic bowl and the metal bowl is configured to be mounted to the plurality of metal bars.

2. The cooking system according to claim 1, wherein the oven comprises a water container and a dosing pump for supplying a predetermined amount of water into at least the plastic bowl.

3. The cooking system according to claim 1, wherein the first stirrer is configured to be installed within the plastic bowl and comprises a first paddle spaced apart from a bottom wall of the plastic bowl and a second paddle placed substantially diametrically opposed to the first paddle, the second paddle having an upper connection portion and a vertical portion spaced apart from a side wall of at least the plastic bowl.

4. The cooking system according to claim 1, wherein a second stirrer is configured to be installed within the metal bowl and comprises a hinge configured to allow a rotational movement of the second stirrer from a vertical active configuration to a substantially horizontal idle configuration.

5. The cooking system according to claim 4, wherein the second stirrer further comprises a paddle having an upper humps-shaped profile defining a first curved portion closer to a shaft of the metal bowl and a second curved portion farther from the shaft, the first curved portion being higher than the second curved portion.

6. The cooking system according to claim 5, wherein the second curved portion is positioned with respect to the first curved portion such that the first curved portion extends along a first plane and the second curved portion extends along a second plane, the second plane angled relative to the first plane.

7. The cooking system according to claim 1, wherein the oven comprises a detector that detects which of the plastic bowl and the metal bowl is mounted in the oven.

8. The cooking system according to claim 7, wherein said cooking system comprises a plurality of packages, each of the plurality of packages containing certain predetermined ingredients and being provided with readable information thereon, and wherein the oven comprises a data reader configured to automatically detect one of the plurality of packages and to program the oven accordingly.

9. The cooking system according to claim 8, wherein the oven includes a Radio-Frequency Identification (RFID) sensor, and wherein each of the plurality of packages is provided with a RFID tag configured to be read by the RFID sensor of the oven.

10. The cooking system according to claim 1, wherein the plurality of metal bars are C-shaped and configured to snap engage one of the plastic bowl and the metal bowl for fastening to the oven.

11. A cooking system for the preparation of foods, comprising:
    an oven including a microwave source and a heater;
    a cooking bowl mounted to the oven, wherein the cooking bowl is one of at least two interchangeable bowls, the at least two interchangeable bowls comprising a plastic bowl configured to be used when the microwave source is activated and a metal bowl configured to be used when the heater is activated;
    a stirrer comprising:
        a first paddle extending orthogonally from a bottom end of a central cylindrical portion proximate a bottom wall of the cooking bowl, the first paddle including a terminal end spaced apart from a side wall of the cooking bowl; and
        a second paddle including a single connecting portion and a stirring portion, wherein the connecting portion extends orthogonally from the central cylindrical portion and is substantially diametrically opposed to the first paddle, and further wherein the stirring portion extends from the connecting portion toward the bottom wall of the cooking bowl and in parallel with the central cylindrical portion at a distal end of the connecting portion; and wherein the oven comprises a water container and a dosing pump for supplying a predetermined amount of water into the cooking bowl.

12. The cooking system according to claim 11, wherein the oven comprises a detector that detects which of the at least two interchangeable bowls is mounted in the oven.

13. The cooking system according to claim 12, wherein said cooking system comprises a plurality of packages each containing certain predetermined ingredients and being provided with readable information thereon, and further wherein the oven comprises a data reader configured to automatically detect one of the plurality of packages and to program the oven accordingly.

14. A cooking system for the preparation of foods, comprising:

an oven including a microwave source and a heater;

a plastic bowl including a first stirrer, the first stirrer including first and second opposing paddles, wherein the plastic bowl is configured to be mounted to the oven and used when the microwave source is activated;

a metal bowl including a plurality of protruding ribs and having a second stirrer, the metal bowl being interchangeable with the plastic bowl, wherein the second stirrer is configured to be spaced apart from the protruding ribs of the metal bowl, and further wherein the metal bowl is configured to be mounted to the oven and used when the heater is activated, and further wherein one of the plastic bowl and the metal bowl is positioned such that a stirrer shaft of the one of the plastic bowl and the metal bowl is configured to engage with one of the first stirrer and the second stirrer, respectively, and further wherein the oven comprises a detector configured to detect which of the plastic bowl and the metal bowl is mounted in the oven; and a plurality of metal bars, each of the plurality of metal bars including a central body spaced apart from a bottom wall of the oven to define a receiving space, a first end coupled with the bottom wall of the oven, and a second end coupled with the bottom wall of the oven, wherein each of the plastic bowl and the metal bowl is configured to be mounted to the plurality of metal bars.

15. The cooking system according to claim 14, wherein the oven comprises a water container and a dosing pump for supplying a predetermined amount of water into at least the plastic bowl.

16. The cooking system according to claim 14, wherein said cooking system comprises a plurality of packages each containing certain predetermined ingredients and being provided with readable information thereon, and further wherein the oven comprises a data reader configured to automatically detect one of the plurality of packages and to program the oven accordingly.

17. The cooking system according to claim 16, wherein the oven includes a Radio-Frequency Identification (RFID) sensor, and wherein each of the plurality of packages is provided with a RFID tag configured to be read by the RFID sensor of the oven.

18. The cooking system according to claim 14, wherein the second stirrer includes a hinge configured to move the second stirrer between a vertical position and a horizontal position.

* * * * *